Dec. 28, 1965  F. P. BUITING  3,226,636
DUAL FUNCTION CIRCUIT
Filed Dec. 21, 1960
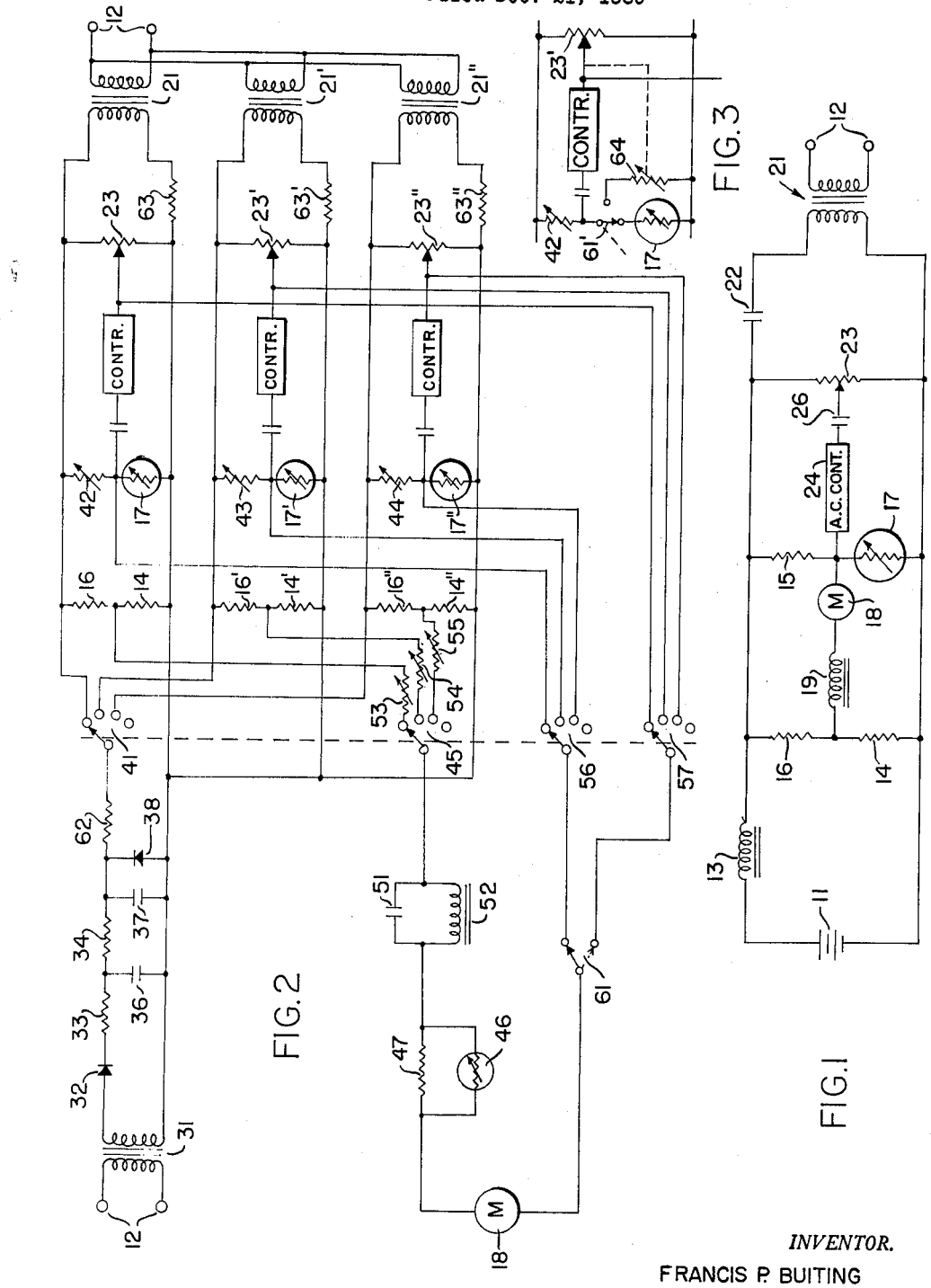
INVENTOR.
FRANCIS P. BUITING
BY Kenway, Jenney & Hildreth
ATTORNEYS

# United States Patent Office 3,226,636
Patented Dec. 28, 1965

3,226,636
DUAL FUNCTION CIRCUIT
Francis P. Buiting, Sudbury, Mass., assignor to Fenwal, Incorporated, Ashland, Mass., a corporation of Massachusetts
Filed Dec. 21, 1960, Ser. No. 77,400
2 Claims. (Cl. 324—65)

My invention relates to an improved electrical circuit for use with transducers that change variations in a physical quantity to variations in an electrical impedance. More particularly, it is concerned with a circuit for performing at least two separate functions in response to the changes in transducer impedance which result from changes in the physical quantity. For example, one may desire to indicate the changes in the physical quantity and also to provide a monitor which operates when the quantity reaches a predetermined level; or one may desire to provide a control signal for actuating other equipment in response to the changes in the physical quantity at the same time as its value is indicated. Finally, one may desire to automatically monitor the quantity and also produce a control signal. My invention is concerned with an improved circuit for performing at least two of these functions simultaneously from a single transducer.

Inherent in most systems for measuring and controlling or monitoring a physical quantity such as temperature pressure is the need for some form of indicator that can be perceived readily and acted upon directly to establish by manual adjustment a desired mode of control. A familiar example is the ordinary household thermostat which includes in addition to a bi-metallic or other temperature sensitive element for control purposes, a direct reading thermometer which makes use of a column of mercury or alcohol. Here two different temperature sensing devices perform the control and indicating functions required of the apparatus. In many applications, however, particularly in the field of industrial control, it is desirable to use a single sensing device to perform both functions simultaneously because of the close correlation between indicating and controlling or monitoring which the application demands. Also, the economic advantage of utilizing one highly accurate sensing device is important in tailoring the design of the apparatus to the commercial market.

One of the most useful circuits for use with a transducer whose impedance changes in response to variations in a physical quantity is the four arm bridge circuit, the transducer impedance forming a part or all of the impedance of one of the four arms. When two functions are to be performed by the same transducer it has been the practice to provide two bridges, the arm including the transducer and one other arm being common to two of the bridges. One of the two bridges may then be used to provide, for example, a signal for indication purposes and the other bridge for monitoring or control purposes. When such an arrangement is provided, it is usually desirable to have the bridge which provides the monitoring or control signal adjustable so that when the physical quantity is below (or above) a certain value which is set by the user, one action takes place, and if it rises above this value, another action takes place. The adjustment in circuits of the type described is performed by adjusting the ratio of the two non-common impedances in the monitor or control bridge.

When, as is conventional, both bridges are supplied from a common power supply, it will be apparent that the measuring or indicating circuit on the one hand and the monitoring or controlling circuit on the other must both present a high input impedance to their respective bridges. Otherwise, interaction may occur between the bridges. For example, adjusting the setting on the monitor or controller bridge might affect the reading of the indicator, even though in fact no change had taken place in the measured physical quantity. The necessary high impedance across the bridge can be provided by high input impedance amplifiers inserted in cascade between the bridges and their circuits they supply. This has been the solution utilized prior to my invention when the circuit to be supplied had a low impedance. If the circuit inherently had a high impedance a buffer amplifier was not required.

While the solution indicated has proven satisfactory, it also increases the required complexity and cost of the circuit. Although vacuum tube amplifiers are satisfactory for this purpose, since they inherently have high input impedance, they also have the inherent disadvantages of vacuum tube circuits, i.e., high power drain, short life, and fragility. Accordingly, transistor amplifiers are to be preferred for this use. However, because transistors have inherently lower input impedance, the required transistor amplifiers are complex and expensive.

I have found that the problems of prior circuits, as described above, may be overcome to a large extent by supplying the two bridges from two different power sources of different frequencies. The measuring or indicating circuit is made responsive to a first frequency, while presenting essentially an open circuit to the second frequency; the monitoring or control circuit is made responsive to the second frequency, while presenting essentially on open circuit to the first frequency. In this way problems of interaction between the two bridges are obviated, and complex and expensive high input impedance amplifiers are not required. I have found, in particular, that if the resistance of the transducer is the variable parameter, so that one of the two frequencies may be 0 cycles per second, i.e., D.C., a particularly simple and useful circuit results.

Thus, a principal object of my invention is to provide an improved circuit for performing two or more functions in response to impedance variations of a transducer which in turn is responding to variations in a physical quantity.

A more specific object of my invention is to provide a circuit of the type described which utilizes a pair of impedance bridges with a single transducer to perform two functions in response to transducer impedance changes.

A further object of my invention is to provide a circuit of the type described in which interaction between the two bridges is substantially eliminated.

A still further object of my invention is to provide a circuit of the type described which is simple and economical in construction, in that a single relatively low cost transistor amplifier may be used, but which is accurate and physically compact.

Other and further objects of my invention will in part be obvious and will in part become apparent from the following detailed description and the drawing in which it refers.

In the drawing:

FIG. 1 is a schematic diagram of a simple circuit incorporating my invention;

FIG. 2 is a schematic diagram of a commercial instrument which incorporates my invention; and FIG. 3 is a fragmentary schematic diagram showing the manner in which the circuit of FIG. 2 may be modified for greater accuracy as will be explained herein.

I have chosen to illustrate my invention with respect to a thermistor, a variable resistance transducer which exhibits substantial change in resistance in response to relatively small temperature changes. The thermistor is one common element in a pair of resistance bridges. One bridge is used to measure the temperature of the thermistor ambient. The other bridge provides a signal to operate a monitor and controller. In the embodiment to be described below the monitor-controller, hereinafter referred to simply as a "controller," is to operate at some particular temperature which is manually set into the instrument. This setting will be referred to herein as the "set point." This set point is adjusted by adjusting the impedance ratio of two of the arms of the controller bridge.

It will be understood that while the embodiment of my invention utilizes a transducer whose resistance changes, it is equally applicable to transducers which exhibit changes in inductive or capacitive reactance in response to a change in the physical quantity being measured. It is also applicable to circuits performing functions other than the indicating and monitor-controlling functions, these two having been selected for purposes of illustration.

With reference to FIG. 1 it will be observed that the numeral 11 refers to a source of direct voltage such as a battery and the numeral 12 refers to a source of alternating voltage such as an ordinary 110 volt outlet. Coupled to the battery 11 through an inductor 13 is the input circuit of a resistance bridge comprised of fixed resistors 14–16, and a thermistor 17. Coupled to the output circuit of the bridge, that is from the junction of resistors 14, 16 to the junction of resistors 15, 17 is a voltmeter 18 and an inductor 19 in series with the voltmeter.

To the alternating voltage source 12 is coupled an isolating transformer 21, and coupled to the secondary of the isolating transformer through a capacitor 22 is a potentiometer 23. The ends of the potentiometer winding are connected to resistors 15, 17 so as to form a second resistance bridge. The movable arm of the potentiometer and the junction of the latter two resistors define the output circuit of the bridge. This output circuit is coupled to a controller 24 responsive to the alternating signal from the controller bridge and a capacitor 26 in series with the controller. The controller may take the form of a simple relay device or preferably a one or two stage transistor amplifier which is adapted to control a relay or other switching device. This amplifier, as explained above, can be of relatively simple construction.

In operation, the extent of unbalance of the bridge including resistors 14 and 16 is reflected in the magnitude of the direct voltage developed across the meter 18. Substantially no alternating voltage appears across the meter because of the relatively high impedance of the inductor 19. Conversely, no direct voltage appears across the controller 24, because of the presence of capacitor 26 in series with it. Instead, the controller 24 is caused to respond to the alternating voltage developed across the output circuit of the bridge including potentiometer 23 which voltage reflects the extent of unbalance that is exhibited by this bridge. As temperature response element 17 is common to both bridges, it is evident that the magnitudes of both the aforementioned alternating and direct voltages are determined by the resistance and hence the temperature of element 17.

The capacitor 22 isolates the impedance of the alternating voltage source from the meter 18 and the inductor 13 similarly prevents the battery 11 from shunting the controller bridge. The inductor 13 and capacitor 22 also isolate the sources from each other. The temperature at which controller 24 operates, i.e. its "set point" is controlled by adjustment of the movable arm of the potentiometer 23.

In the embodiment of FIG. 2, it will be observed that a single A.C. source 12 is employed together with a rectifier circuit including a transformer 31, a diode 32 and a ripple filter formed with series resistors 33, 34 and shunt capacitors 36, 37. A Zener diode 38 serves as a voltage regulator. In contrast to the embodiment of FIG. 1, the embodiment of FIG. 2 is adapted to indicate selectively the temperature at a plurality of physically displaced stations, three by way of example, and to this end makes use of three direct voltage bridge circuits similar to the one described in FIG. 1, and three alternating voltage bridge circuits also similar to the one described in FIG. 1. The three direct voltage bridges have their input circuits selectively coupled to the output of the aforementioned rectifier and filter circuit by means of a selector switch 41. The alternating voltage bridge circuits are coupled to A.C. source 12 by individual isolation transformers 21, 21′ and 21″. Other corresponding elements in FIG. 2 have been assigned the same reference numerals as their counterparts in FIG. 1 except that primes and double primes have been added to distinguish the apparatus at several stations. The resistors 42–44 are adjustable in FIG. 2, in contrast to the fixed resistor 15 in FIG. 1, for purposes of calibration of the meter to the particular characteristics of the individual thermistors used in the bridge.

Selectively coupling the output circuits of the respective direct voltage bridges to meter 18 is a selector switch 45 and in circuit with the meter 18, is a temperature compensating resistor 46 and a fixed resistor 47. Resistors 46, 47 are disposed in parallel to one another and the combination thereof is disposed in series with the meter. Also disposed in series with the meter is a circuit to provide alternating current isolation, namely the parallel combination of a capacitor 51 and inductor 52 tuned to the frequency of the source 12, such as 60 cycles per second. Also, for meter calibration, potentiometers 53–55 are provided between the respective stationary contacts of switch 45 and the junctions of resistors 14, 14′, 14″ and 16, 16′ and 16″.

A feature of the embodiment of FIG. 2 is the provision of selector switches 56 and 57 which are ganged with switches 41 and 45. The taps of switch 56 are connected to the respective junctions of resistors 42, 43, 44 and 17, 17′ and 17″. The taps of switch 57 are connected to the movable arms of the potentiometers 23, 23′, and 23″. Finally, the movable arms of the switches 56, 57 themselves are selectively connected to one terminal of the meter by a separate two-position selector switch 61. When the switch 56 is made operative by the positioning of switch 61 as shown by the solid line, meter 18 is connected to the junction of resistors 42, 17 or their counterparts at one of the other stations depending upon the position of switch 56. In consequence, the meter then indicates the extent of unbalance of the direct current bridge caused by the thermistor as reflected in the voltage developed across the meter as previously described. On the other hand, when switch 57 is made operative by the positioning of switch 61 as shown by the dotted line, meter 18 has one of its terminals connected to the movable arm of potentiometer 23 or one of its counterparts at the other stations depending upon the position of switch 57. In consequence, meter 18 is adapted to indicate the magnitude of the direct voltage developed from the junction of resistors 14, 16 to the arm of the potentiometer. This direct voltage is a convenient indication of the setting of the potentiometer which in turn reflects the control point at which the controller reacts. Thus, in the embodiment of FIG. 2, the meter is adapted to indicate both actual temperature or set point depending upon the position of switch 61. Otherwise the apparatus operates in like fashion as has been described in connection with FIG. 1 with the exception that resistors 62 and 63 are provided for purposes of isolation in place of the inductor 13 and capacitor 22 of FIG. 1.

One of the important features of my invention is illustrated in FIG. 2. As there shown, only a single regulated direct voltage supply is required and this may be shifted selectively to each of the circuits in turn. In prior constructions which utilized a single supply and operated both bridges from this supply three separate regulated supplies would be required. Thus, an instrument made according to my invention for multi-location use is substantially less complex and expensive than those previously available.

As described above, the "set point" for the controller bridge may be measured by operating switch 61 and observing the reading on meter 18. Thus, by holding switch 61 in the broken line position and adjusting potentiometer 23, the controller operating point may be accurately adjusted to operate a given temperature. However, the "set point" may be adjusted which is the temperature of the thermistor and therefore, its resistance is not at the "set point" value. Thus, the setting made in the manner described will be incorrect. In general, the inaccuracy is small, especially where the setting of the controller bridge is close to the temperature of the thermistor at the time the setting is made. However, if greater accuracy is desired, the improvement illustrated in FIG. 3 may be applied to the circuit of FIG. 2.

FIG. 3 is a schematic of the controller bridge of the upper circuit in FIG. 2. As shown, a switch 61' is inserted between the thermistor 17, and the resistor 42. This switch is ganged with the switch 61. In the full line position of switch 61' which corresponds to the full line position of switch 61, the thermistor 17 is connected in the circuit as previously described. However, when switch 61 is operated to the other position, switch 61' which is ganged with it, connects the variable resistor 64 in the circuit in place of thermistor 17. It will be observed that variable resistor 64 is ganged with the movable arm of potentiometer 23.

Thus, when the "set point" is to be adjusted, switch 61 is operated switching one terminal of meter 18 to the movable arm of potentiometer 23. At the same time, variable resistor 64 replaces thermistor 17 in the measuring bridge. As the control bridge is adjusted, the resistor 64 is varied at the same time so that for any temperature setting the resistor 64 will have the resistance that the thermistor 17 will have when it reaches that temperature. In this way, a very accurate visual adjustment of the "set point" may be accomplished.

It will thus be seen that by using sources having two different frequencies (0 c.p.s. and 60 c.p.s. in the illustrated embodiment) in connection with a pair of bridge circuits having a common variable impedance, I have provided an improved circuit for performing two functions in response to transducer impedance changes. In particular, conventional amplifiers may be used, if indeed such amplifiers are necessary; further, one regulated power supply may be used in connection with a number of different dual function circuits, the signal for the controller not being required to be regulated.

Although the invention has been described in terms of temperature as the physical quantity to be indicated and controlled, it will be appreciated by those skilled in the art that it is equally applicable to use with other types of transducing devices which exhibit impedance variations in response to variations in a physical quantity. Also it will be appreciated that various modifications of the circuits described that are within the spirit and scope of the invention are possible. Therefore the invention should not be deemed to be limited to the details of what has been described herein by way of example, but rather it should be deemed to be limited only to the scope of the appended claims.

Having described my invention, what I claim as new and desire to secure by Letters Patent is:

1. Apparatus for simultaneously measuring and controlling temperature, said apparatus comprising, in combination, a source of alternating voltage, a source of direct voltage, first and second resistors disposed in series across said sources, third and fourth resistors disposed in series across said sources, said fourth resistor exhibiting resistance variations in response to variations in the temperature to be meaured and controlled, a two postion selector switch having a movable contact and two fixed contacts, direct voltage measuring means connected between the junction of said first and second resistors and the movable contact of said selector switch, one of the fixed contacts of said selector switch being connected to the juction of said third and fourth resistors to provide thereby a measure of the direct voltage between the junction of said third and fourth resistors and the junction of said first and second resistors when said switch is in a first position, means to prevent alternating current from flowing through said direct voltage measuring means, a potentiometer having two end terminals and a movable contact, the end terminals of said potentiometer being connected across said sources, a temperature controller responsive to alternating current signals connected between the junction of said third and fourth resistors and the movable contact of said potentiometer adjustment of the movable contact of said potentiometer adjusting the voltage set point for said controller, means to prevent direct current from flowing through said controller, and means connecting a second fixed contact of said selector switch to the movable arm of said potentiometer to provide thereby a measure of the direct voltage by said direct voltage measuring means between the junction of said first and second resistors and the movable arm of said potentiometer when said switch is in a second position thereby indicating the temperature corresponding to the set point for said controller.

2. The combination defined in claim 1 which includes a variable resistor, means causing the value of said variable resistor to change with changes in the setting of said potentiometer to provide thereby a resistance value substantially equal to the value of said fourth resistor at the set point temperature determined by said potentiometer setting, a second selector switch having a movable contact and two fixed contacts, the movable contact of said second selector switch being connected to the end of said third resistor not connected to said sources, one of said fixed contacts being connected to one end of said fourth resistor and the other of said fixed contacts to one end of said variable resistor, the other ends of said fourth resistor and said variable resistor being connected together and to a terminal of said source, said second selector switch being ganged for operation with said first selector switch, whereby when said first selector switch is in said first position, said fourth resistor is connected in series with said third resistor and when said first selector switch is in said second position, said variable resistor is connected in series with said third resistor.

References Cited by the Examiner

UNITED STATES PATENTS

| 2,585,121 | 2/1952 | Hartman | 324—62 |
| 2,592,101 | 4/1952 | Aiken | 324—57 |
| 2,684,592 | 7/1954 | Hadady | 324—62 |
| 2,707,265 | 4/1955 | Lugosch | 324—62 X |
| 2,782,102 | 2/1957 | Howe | 324—62 X |
| 2,917,706 | 12/1959 | Thompson | 324—62 X |

FOREIGN PATENTS 668,142    2/1952    Great Britain.

OTHER REFERENCES

"Transformer Bridges for Use With Resistance Strain Gauges and Similar Transducers," article in Journal of Scientific Instruments, October, 1960, pages 381–384.

WALTER L. CARLSON, *Primary Examiner.*

SAMUEL BERNSTEIN, *Examiner.*